US008715541B2

(12) United States Patent
Liu

(10) Patent No.: US 8,715,541 B2
(45) Date of Patent: May 6, 2014

(54) REUSABLE LENS MOLDS AND METHODS OF USE THEREOF

(75) Inventor: Alice Weimin Liu, Alpharetta, GA (US)

(73) Assignee: Novartis AG, Basel (CH)

( * ) Notice: Subject to any disclaimer, the term of this patent is extended or adjusted under 35 U.S.C. 154(b) by 210 days.

(21) Appl. No.: 12/638,162

(22) Filed: Dec. 15, 2009

(65) Prior Publication Data

US 2010/0155976 A1 Jun. 24, 2010

Related U.S. Application Data

(60) Provisional application No. 61/138,620, filed on Dec. 18, 2008.

(51) Int. Cl.
*B29D 11/00* (2006.01)
*B29D 35/08* (2010.01)
*G02C 7/02* (2006.01)

(52) U.S. Cl.
USPC ................ 264/1.32; 425/808; 264/1.38

(58) Field of Classification Search
USPC ........ 425/810, 552, 195, 808; 264/1.32, 1.38, 264/2.5
See application file for complete search history.

(56) References Cited

U.S. PATENT DOCUMENTS

| | | | |
|---|---|---|---|
| 3,734,449 A * | 5/1973 | Itou et al. ................... 249/114.1 |
| 4,113,224 A | 9/1978 | Clark | |
| 4,202,848 A * | 5/1980 | Neefe ............................ 264/1.8 |
| 4,208,364 A | 6/1980 | Shepherd | |
| 4,208,365 A | 6/1980 | LeFevre | |
| 4,921,205 A | 5/1990 | Drew, Jr. | |
| 5,004,627 A * | 4/1991 | Presswood et al. ........... 427/133 |
| 5,143,660 A | 9/1992 | Hamilton | |
| 5,156,754 A | 10/1992 | Nomura | |
| 5,196,506 A * | 3/1993 | Tamai et al. .................. 528/353 |
| 5,362,226 A * | 11/1994 | Kataoka et al. ............... 425/526 |
| 5,456,864 A | 10/1995 | Wickes | |
| 5,573,108 A | 11/1996 | Hamilton | |
| 5,578,332 A | 11/1996 | Hamilton | |
| 5,620,717 A | 4/1997 | Wickes | |

(Continued)

FOREIGN PATENT DOCUMENTS

| | | |
|---|---|---|
| EP | 0412891 A2 | 2/1991 |
| EP | 1 614 535 A1 | 1/2006 |

(Continued)

OTHER PUBLICATIONS

PCT International Search Report dated Apr. 20, 2011, International Application No. PCT/US2009/067990, International Filing Date Dec. 15, 2009.

(Continued)

*Primary Examiner* — Joseph S Del Sole
*Assistant Examiner* — Nahida Sultana
(74) *Attorney, Agent, or Firm* — Robert Ambrose

(57) ABSTRACT

Described herein are devices for producing ophthalmic lenses including at least one mold half defining an optical surface where the mold half is made from a polymer that includes an aromatic polyimide, a polyphenylene, or a combination thereof. The devices exhibit numerous advantages including, but not limited to, good chemical resistance, durability, machineability, and UV absorbing properties. Also described are methods for producing ophthalmic lenses using the devices described herein. The ophthalmic lenses produced with the devices described herein exhibit excellent optical properties when compared to lenses produced from conventions molds.

20 Claims, 5 Drawing Sheets

(56) References Cited

U.S. PATENT DOCUMENTS

| | | | |
|---|---|---|---|
| 5,893,998 A * | 4/1999 | Kelley et al. | 249/111 |
| 5,928,575 A * | 7/1999 | Buazza | 264/1.38 |
| 5,951,934 A | 9/1999 | Wickes | |
| 5,965,630 A | 10/1999 | Imafuku | |
| 6,508,961 B1 * | 1/2003 | Feist et al. | 264/1.33 |
| 6,602,930 B2 | 8/2003 | Imafuku | |
| 6,638,451 B1 | 10/2003 | Hagmann | |
| 6,800,225 B1 | 10/2004 | Hagmann | |
| 6,821,108 B2 | 11/2004 | Hagmann | |
| 6,949,296 B2 | 9/2005 | Dunbar | |
| 6,997,428 B1 | 2/2006 | Andino | |
| 6,997,693 B2 | 2/2006 | Hörner | |
| 7,026,436 B2 | 4/2006 | Kanakarajan | |
| 7,115,899 B2 | 10/2006 | Uckert | |
| 7,244,790 B2 | 7/2007 | Sunkara | |
| 7,268,193 B2 | 9/2007 | Marrocco, III | |
| 7,338,994 B2 | 3/2008 | Walton | |
| 7,348,080 B2 | 3/2008 | Kanakarajan | |
| 7,365,146 B2 | 4/2008 | Thomas | |
| 7,375,250 B2 | 5/2008 | Saitoh | |
| 7,582,704 B2 * | 9/2009 | Schorzman et al. | 525/326.2 |
| 7,627,382 B2 | 12/2009 | Minar | |
| 2002/0005933 A1 * | 1/2002 | Imafuku | 351/177 |
| 2003/0006514 A1 * | 1/2003 | Kosuge et al. | 264/1.1 |
| 2003/0075814 A1 * | 4/2003 | Keller et al. | 264/1.32 |
| 2003/0077350 A1 * | 4/2003 | Horner et al. | 425/195 |
| 2003/0111748 A1 * | 6/2003 | Foreman | 264/1.38 |
| 2004/0119174 A1 | 6/2004 | Hofmann | |
| 2004/0241383 A1 * | 12/2004 | Watanabe et al. | 428/73 |
| 2005/0140034 A1 * | 6/2005 | Ishikawa | 264/1.33 |
| 2006/0009615 A1 | 1/2006 | Uhara | |
| 2006/0223923 A1 | 10/2006 | Cavalli | |
| 2006/0247378 A1 | 11/2006 | Sunkara | |
| 2007/0083016 A1 | 4/2007 | Dueber | |
| 2007/0222108 A1 | 9/2007 | Warkoski | |
| 2007/0299212 A1 | 12/2007 | Smillie | |
| 2008/0067702 A1 * | 3/2008 | Yao et al. | 264/1.1 |
| 2008/0194747 A1 | 8/2008 | Otterstedt | |
| 2008/0287626 A1 * | 11/2008 | Schorzman et al. | 526/245 |
| 2009/0137771 A1 * | 5/2009 | Moriyama et al. | 528/380 |
| 2009/0188014 A1 | 7/2009 | Chiou | |

FOREIGN PATENT DOCUMENTS

| | | |
|---|---|---|
| JP | 2004077552 A2 | 3/2004 |
| JP | 2004107657 A2 | 4/2004 |
| JP | 2006117561 A2 | 5/2006 |
| JP | 2006176581 A2 | 7/2006 |
| JP | 2006201670 A2 | 8/2006 |
| JP | 2007169494 A2 | 7/2007 |
| JP | 2007177024 A2 | 7/2007 |
| JP | 2007197696 A2 | 8/2007 |
| JP | 2007272072 A2 | 10/2007 |
| JP | 2008144049 A2 | 6/2008 |
| WO | 2007101858 A2 | 9/2007 |

OTHER PUBLICATIONS

PCT Written Opinion of the International Searching Authority dated Apr. 20, 2011, International Application No. PCT/US2009/067990, International Filing Date Dec. 15, 2009.

PCT Invitation to Pay Aditional Fees dated Jan. 11, 2011, International Application No. PCT/US2009/067990, International Filing Date Dec. 15, 2009.

* cited by examiner

REUSABLE LENS MOLDS AND METHODS OF USE THEREOF

This application claims the benefits under 35 U.S.C. 119(e) of the U.S. Provisional Patent Application No. 61/138,620 filed on Dec. 18, 2008, incorporated herein by reference in its entirety.

BACKGROUND

To produce a contact lens, a predetermined amount of flowable starting material is introduced into the female mold half. The mold is then closed by applying the male mold half. The subsequent polymerization or crosslinking of the starting material is effected by irradiation with UV light, by thermal action, or by another, non-thermal method, wherein the starting material in the mold cavity is fully cured.

In general, two types of mold systems are used to produce ophthalmic lenses such as contact lenses. The first involves the use of plastic molds produced by injection molding. The materials currently used to make the plastic molds include polypropylene, polymethylmethacylate, polyacrylonitirile, ethylene vinyl alcohol copolymer, and polyvinylidene chloride. These materials have limited chemical resistance. The starting materials used to produce the lenses can be particularly harsh and damage the surface of the mold. For example, polymethylmethacylate (PMMA) has poor chemical resistance and cannot withstand the aggressive solvents used in silicon hydrogel (SiHy) formulations typically used in the formation of contact lenses. Damage of the mold surface ultimately compromises the optical quality of the lens produced from the damaged mold. Thus, the plastic molds are generally not reusable, which presents significant economic disadvantages when manufacturing the lenses.

The second approach involves the use of glass or quartz molds that have excellent UV transmission and glass absorbing properties. Although this is a viable approach for the production of contact lenses, there are limitations. Both quartz (male mold half) and glass (female mold half) are manufactured by casting, which is very expensive and requires long lead times. Therefore, the use of glass and quartz molds is extremely cost prohibitive and time consuming.

It would be desirable to have plastic molds that are chemically resistant to formulations typically used in the manufacturing of contact lenses. Thus, the molds would be reusable and not have to be discarded after immediate use. In addition to being chemically resistant to certain reagents and starting materials, the material used to produce the mold should be readily machineable in order to produce mold surfaces with optical quality. It is also desirable that the mold material be dimensionally stable. In the case of UV curing, it is also desirable that the mold effectively absorbs UV light yet reflects and transmits little to no UV energy. Finally, it would be desirable that molds be relatively inexpensive to manufacture compared to molds made from quartz or glass. Described herein are devices that address these needs.

SUMMARY

Described herein are devices for producing ophthalmic lenses including at least one mold half defining an optical surface where the mold half is made from a polymer that includes an aromatic polyimide, a polyphenylene, or a combination thereof. The devices exhibit numerous advantages including, but not limited to, good chemical resistance, durability, machineability, and UV absorbing properties. Also described are methods for producing ophthalmic lenses using the devices described herein. The ophthalmic lenses produced with the devices described herein exhibit excellent optical properties when compared to lenses produced from conventions molds. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
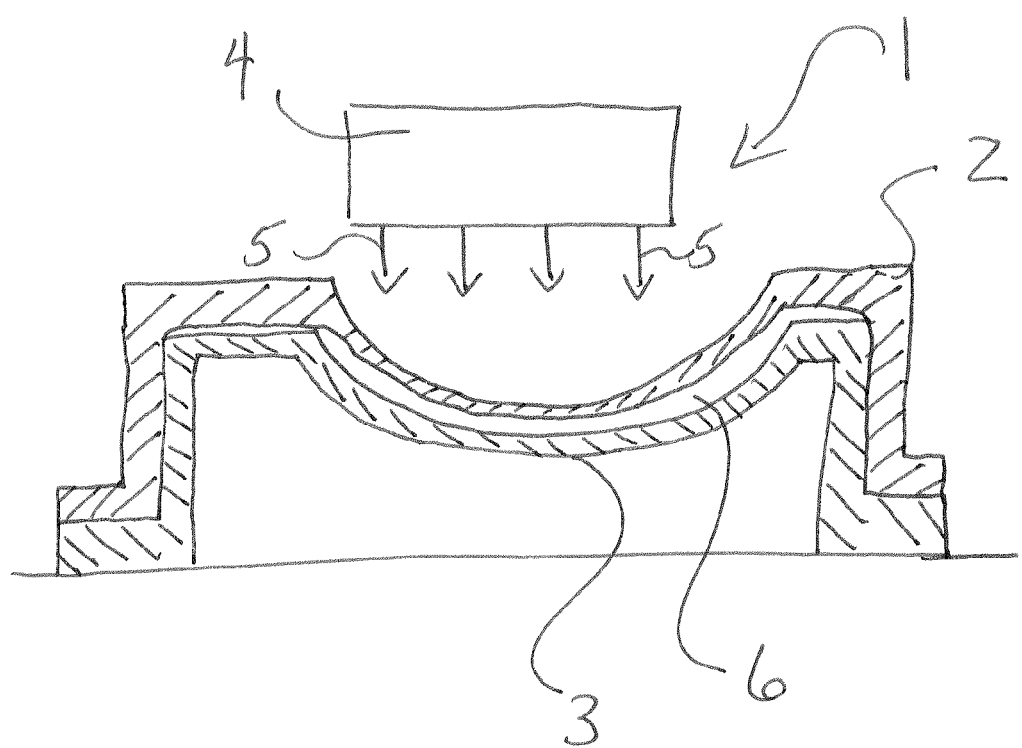
FIG. 1 shows an exemplary device composed of male and female halves for making a contact lens.

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a polymer" includes mixtures of two or more such polymers, and the like.

"Optional" or "optionally" means that the subsequently described event or circumstance can or cannot occur, and that the description includes instances where the event or circumstance occurs and instances where it does not.

The term "aromatic group" as used herein is any group containing an aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "alkyl group" as used herein is a branched or unbranched saturated hydrocarbon group of 1 to 25 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "imide" as used herein is defined by the general formula —C(O)NC(O)—, where the imide group can be attached to the same aromatic group or different aromatic groups. The nitrogen atom can be hydrogen, an alkyl group, or an aromatic group.

Described herein are devices for producing an ophthalmic lens comprising a mold half defining an optical surface where the mold half is made from a polymer comprising an aromatic polyimide, a polyphenylene, or a combination thereof. The male mold half and/or the female mold half may be composed of the aromatic polyimide. The use of these polymers provides numerous advantages, which will be discussed in greater detail below.

The polyphenylene and aromatic polyimide can be a thermoset resin. For example, the device can be prepared by introducing curable prepolymers of the polyphenylene or aromatic polyimide into a mold followed by the application of heat to produce the polymer. Alternatively, the polyphenylene or aromatic polyimide can be a thermoplastic polymer.

With respect to the polyphenylene, it is generally a polymer composed of a plurality of aromatic groups incorporated in the polymer backbone. The aromatic groups may or may not be substituted depending upon the selection of the polyphenylene. In certain aspects, the polyphenylene is composed of a plurality of aromatic groups another bonded to each other to form a rigid polymeric backbone. In one aspect, the polyphenylene comprises a plurality of residues comprising the formula IV

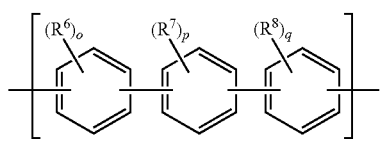

wherein $R^6$, $R^7$, and $R^8$ are, independently, hydrogen, a straight chain or branched alkyl, aryl, alkaryl aralkyl, alkyl amide, aryl amide, alkyl ester, aryl ester, alkoxy, polyalkeneoxy, polyphenylene oxide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, poly(phenoxyphenyl ketone), ether, sulfone, aryl ketone, alkyl ketone, or heteroaryl; and o, p, and q are, independently, 0, 1, 2, or 3.

Referring to formula IV, the position of each aromatic group relative to the other can vary. Thus, the aromatic groups can be ortho, meta, or para to each other. Each of the aromatic groups can be unsubstituted or substituted with one or more groups. The position of the groups on each aromatic group can be the same or vary from aromatic ring to aromatic ring.

In one aspect, the polyphenylene comprises repeat units of the formula V

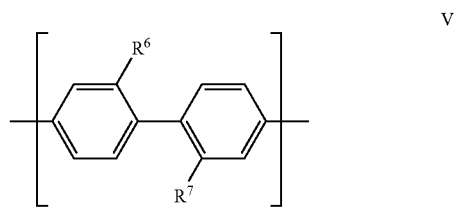

where $R^6$ and $R^7$ are defined above. In the case when $R^6$ and $R^7$ are not hydrogen, $R^6$ and $R^7$ can be syn or anti to one another. For example, referring to formula V, $R^6$ and $R^7$ are anti to one another. The relative positions of $R^6$ and $R^7$ can vary depending upon the selection of $R^6$ and $R^7$.

In another embodiment, the polyphenylene comprises repeat units of the formula VI

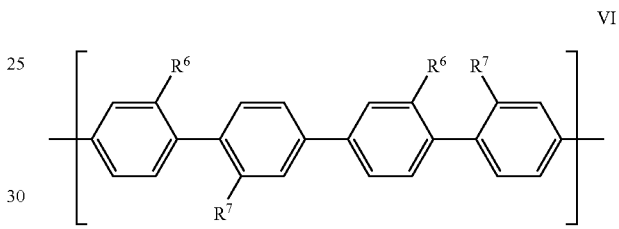

where $R^6$ and $R^7$ are defined above. In this aspect, the polyphenylene is a poly(1,4-phenylene) structure. An example of a polyphenylene having the formula VI includes polymers sold under the tradename PRIMOSPIRE® manufactured by Solvay Advanced Polymers. Examples include PRIMOSPIRE® PR-120 and PR-250, where the polymers vary by molecular weight. Polymers sold under the tradename TECAMAX™ SRP are also polyphenylenes useful herein. In another aspect, the polyphenylenes disclosed in U.S. Pat. No. 7,365,146 and International Publication Nos., WO 2005/072374 and WO 2005/086727, which are incorporated by reference, can be used herein.

In other aspects, the devices herein are made from an aromatic polyimide. The aromatic polyimide is polymer composed of aromatic groups, where one or more imide groups are attached to the aromatic group. In one aspect, the aromatic polyimide comprises repeat units of the formula I

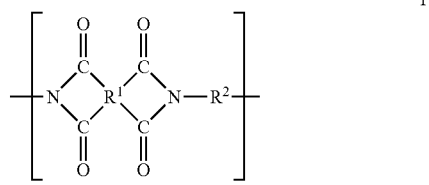

wherein $R^1$ is a substituted or unsubstituted aromatic ring, the four carbonyl groups are attached directly to separate carbon atoms in the aromatic ring, and each pair of carbonyl groups is attached to adjacent carbon atoms in the aromatic ring; and $R^2$ comprises a second substituted or unsubstituted aromatic ring.

In yet another aspect, the aromatic polyimide comprises repeat units of the formula III

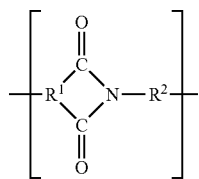

where $R^1$ is a substituted or unsubstituted aromatic ring where four carbonyl groups are attached directly to separate carbon atoms in the aromatic ring and each pair of carbonyl groups is attached to adjacent to adjacent carbon atoms in the aromatic ring, and $R^2$ comprises a second substituted or unsubstituted aromatic ring.

The aromatic rings of $R^1$ and $R^2$ in formulae I and III can be independently fused or linked. In one aspect, $R^1$ may comprise phenyl, naphthyl, anthracene, phenanthrene, pyrene, or various other fused ring chemical structures. In addition, $R^2$ can be linked and fused aromatic groups, including, but not limited to, any of the following:

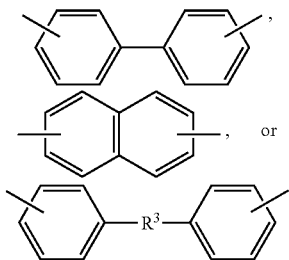

$R^3$ includes a $C_1$ to $C_{25}$ alkyl group or a group having the formula

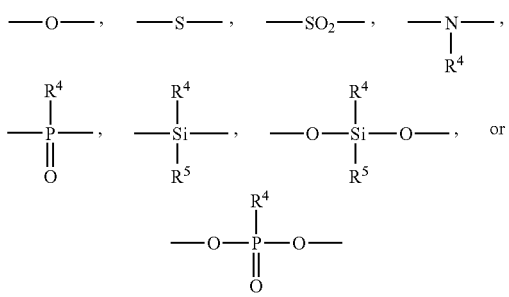

$R^4$ and $R^5$ include, independently, an alkyl group or an aryl group.

In one aspect, referring to formulae I and III, $R^1$ is a phenyl group and $R^2$ is

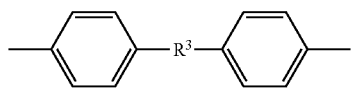

In another aspect, the aromatic polyimide comprises the repeat units having the formula II

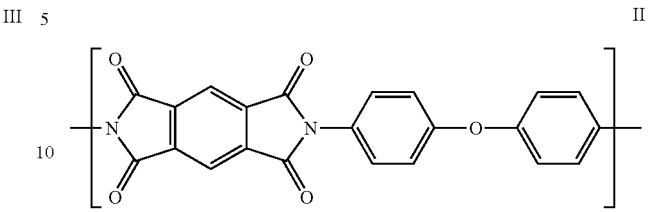

An example of an aromatic polyimide having the formula II includes polymers sold under the tradename VESPEL® manufactured by DuPont. Examples include VESPEL® SP1, SP-21, SP-22, SP-211, or SP-3. In another aspect, the aromatic polyimides disclosed in U.S. Publication Nos. 2006/0271135 and 2007/0222108, which are incorporated by reference, can be used herein.

The polyphenylenes and aromatic polyimides useful herein possess numerous properties that are beneficial in making molds for the production of ophthalmic lenses. The polymers can be easily machined (e.g., extruded) into a variety of shapes and sizes. In addition to machineability, the surfaces of some polymers such as polyphenylenes do not require additional polishing to produce optical surfaces. The polymers exhibit good dimensional stability. For example, the polymers absorb little to no water, which can significantly alter the dimensions of the mold. Another important feature is that the polymers are resistant to harsh chemicals used to produce the ophthalmic lenses. For example, solvents such as ethanol, DMA, isopropanol, and propanol typically used to make contact lenses can adversely react with the mold, which limits the lifetime of the molds. Thus, the polymers permit the molds to be reused numerous times, which provides significant economic advantages with respect to the production of ophthalmic lenses.

In addition to the properties discussed above, the molds produced from polyphenylene or an aromatic polyimide generally absorb UV light in 250 to 400 nm wavelength range. As will be discussed below, the production of ophthalmic lenses involves curing a mixture of monomers and/or prepolymers in order to produce the final lens. Energy such as, for example, UV light can be applied to the mold to cure the mixture. Thus, it is desirable that the material used to make the mold absorb UV light. In addition to absorbing UV light, the polymers substantially prevent the reflection and transmission of UV light. The term "substantially prevents" with respect to reflectance and transmittance is defined herein as less than 10%, less than 8%, less than 6%, less than 4%, less than 2%, or 0% of the UV light that is reflected and transmitted within a range of 200 to 450 nm by the polymer. By reducing the reflectance and transmittance of UV light during curing, it is possible to achieve the correct lens geometry during curing. As shown in the Examples, the molecular weight of the polymer nor the addition of dyes or color blocks affects the reflectance or transmittance of UV light by the polymer.

The molds described herein can be produced using techniques known in the art. Details on the manufacturing and dimensions of the molds are addressed in EP-A-0367513 and U.S. Pat. No. 4,113,224, the teachings of which are incorporated by reference. In other aspects, the molds described herein can be designed so that they have dimensions as described in U.S. Pat. Nos. 6,800,225 and 6,821,108. In certain aspects, a thermoplastic polymer such as a polyphenylene can be machined to produce a mold of any desired shape or size. In the case of polyphenylene, optically smooth surfaces can be obtained without additional polishing steps.

In other aspects, the thermoset resin can be extruded into a variety of shapes and dimensions followed by curing to produce the mold. In other aspects, the mold can be produced by injection molding or compression molding.

The mold halves described herein are useful in producing ophthalmic lenses. In one aspect, the method involves:
(a) introducing a lens forming material into a female mold half configured to form a cavity for receiving a lens forming material;
(b) applying a male mold to the female mold comprising the lens forming material, wherein the male mold and female mold are configured to receive each other and form a mold cavity, wherein at least one mold half is made from a polymer comprising an aromatic polyimide, a polyphenylene, or a combination thereof; and
(c) exposing the lens forming material to energy in order to crosslink the lens forming material and produce the lens.

An exemplary device for manufacturing a contact lens using one or more mold halves described herein is depicted in FIG. 1. Referring to FIG. 1, the device 1 comprises a male mold 2, a female mold 3, and an energy source 4 that directs energy 5 to the male mold. The energy source 5 can produce and direct UV-light or thermal energy to device 1. The female mold 3, which is concave shape, can receive a lens-forming material. The male mold half 2 is configured to be inserted into the concavity of the female mold half 3 and produce a mold cavity 6. Upon application of energy to device 1, the lens-forming material cures in the mold cavity, and the contact lens is ultimately produced.

Depending upon the energy source, one or both mold halves can be produced by an aromatic polyimide and/or a polyphenylene. In one aspect, one of the mold halves is made from a material that readily transmits or permeates UV energy in the range of 250 to 400 nm, and the other mold half is composed of a polyphenylene and/or an aromatic polyimide. Examples of materials that can transmit or permeate UV light include, but are not limited to, quartz, glass, or a combination thereof. In one aspect, the male mold half is composed of a material that transmits or permeates UV light, and the female mold half is composed of a polyphenylene, an aromatic polyimide, or a combination thereof.

In other aspects, both mold halves can be made from a polyphenylene, an aromatic polyimide, or a combination thereof. In this aspect, the use of expensive molds composed of quartz or glass mold is not required. This coupled with the fact that molds composed of a polyphenylene, an aromatic polyimide, or a combination are reusable makes the molds of the present invention a very attractive option for the production of ophthalmic lenses.

Figure 5A:
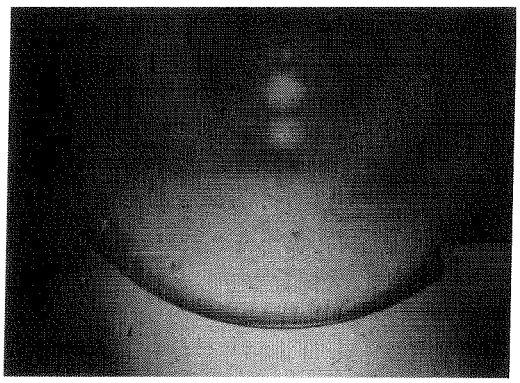
FIGS. 5A and 5B are photographs of contact lenses made from PMMA mold.
Figure 5B:
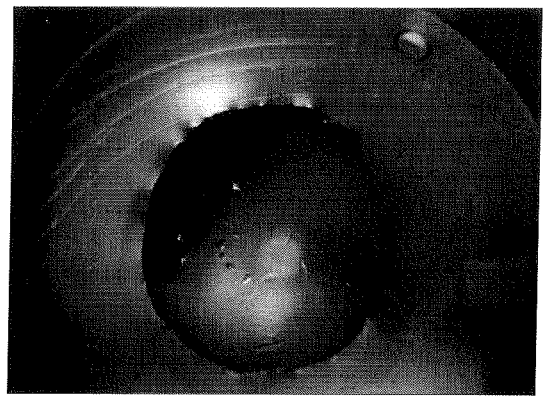
Figure 5C:
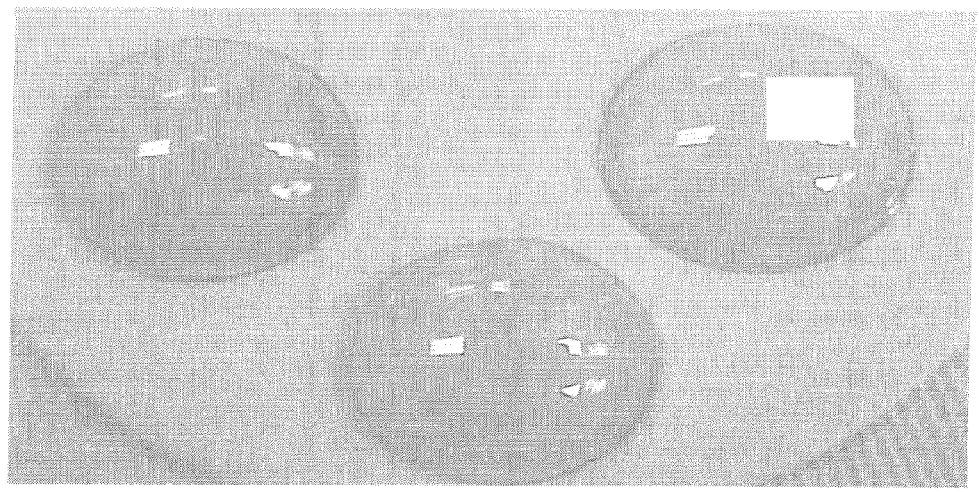
FIG. 5C is a photograph of a contact lens cast in a mold composed of a $CaF_2$ male mold and Primospire PR-120 female mold. The contact lens is a silicon hydrogel.

The molds described herein result in the production of ophthalmic lenses with superior optical quality and little to no defects. For example, lenses cast in poly(methyl methacrylate) (PMMA) molds displayed an unacceptable surface quality and crazing lines at the lens edge (FIG. 5A). In the worst cases, crazing lines were found across the entire lens surface (e.g., see upper left corner of FIG. 5B). Here, the PMMA molds were fully crazed after exposure to the formulation for extended period of time (~5 min), which resulted in the formation of crazing lines on the lens surface as shown in FIG. 5B. Not wishing to be bound by theory, the formation of crazing lines is due to poor chemical resistance of the mold to solvents such as ethanol, N,N'-dimethylacrylamide, isopropanol, and propanol. Conversely, FIG. 5C shows lenses cast in either polyphenylene molds or aromatic polyimide molds. The lenses displayed no surface damage such as crazing as seen in lenses made with the PMMA mold.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Polymers not Suitable for Making Molds

Table 1 lists numerous polymers which were not suitable for making reusable mold halves. These polymers were excluded due to unsatisfactory machineability, durability, or moisture absorption. Further explanation is provided within Table 1.

TABLE 1

| Grade | Polymer | Supplier | Observations |
| --- | --- | --- | --- |
| Torlon ® | polyamide-imide | Solvay | Unable to produce smooth machineable surface. |
| Delrin ® | Polyoxy-methylene (Acetal) | DuPont | Unable to produce smooth machineable surface. |
| Topas ® | cycloolefin (COC) | Ticona | Difficulty to machine and easily scratched. |
| TPX ® | Polymethylpentene | Mitsui | Soft as PP and difficult to machine. Limited chemical resistance to certain solvents. |
| Zenor ™ | Norbonene-PE | Zeon | No commercial stock and shapes. |
| Apel ® | Ethylene-norbornene Copolymer (COP) | Mitsui | No commercial stock and shapes. |
| Celazde ™ | PolyBenzlmidazole (PBI) | PBI | Moisture pickup ranged from 6.5%-13%. Concerned about dimensional change arising from $H_2O$ pickup. |

Polymers Having Acceptable Chemical Resistance

Table 2 lists a number of polymers which displayed good chemical resistance to DMA (N,N'-dimethylacrylamide). These polymers were further tested for adequate % reflectance, absorption, and % transmittance of UV light.

TABLE 2

| Grade | Polymer | Polymer Type | Supplier |
| --- | --- | --- | --- |
| Radel ® R-5000 | polyphenyl-sulfone (PPSU) | Amorphous thermoplastic | Solvay |

TABLE 2-continued

| Grade | Polymer | Polymer Type | Supplier |
|---|---|---|---|
| Tecamax ® SRP-120 (rod) or Primospire ® PR-120 (extrudable grade resin) or Primospire ® PR-250 (injection grade resin) | polyphenylene | Amorphous thermoplastic | Solvay |
| Ultem ® 1000 | Polyetherimide (PEI) | Amorphous thermoplastic | GE Plastics |
| Ketron ® 1000 | poyetheretherketone (PEEK) | Semi-crystalline thermoplastic | Victrex |
| Techtron ® PPS | polyphenylene sulfide (PPS) | Semi-crystalline thermoplastic | Quadrant |
| Vespel ® SP-1 | polyimide (PI) | Thermoset | DuPont |
| Ertalyte ® PET-P | polyethylene terephthalate polyester (PET-P) | Semi-crystalline thermoplastic | Quadrant |

% Reflectance of Polymers

Figure 2:
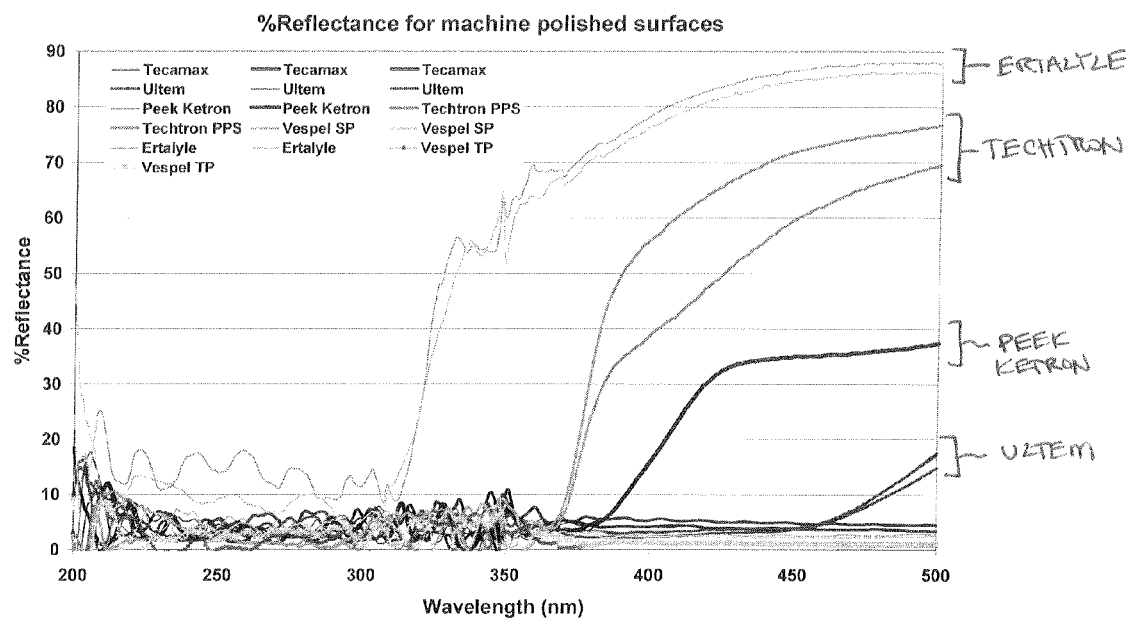
FIG. 2 shows the % reflectance of UV light for several different polymers.

FIG. 2 shows a graph of % reflectance of machine polished surfaces of several polymers. The x-axis displays the wavelength of UV light between the ranges of 200 and 500 nm, and the y-axis displays the % reflectance of each polymer tested relative to a 100% reflective standard. All measurements were obtained using a Carry 3E UV spectrophotometer. The spectrophotometer's source beam was oriented orthoganol to the sample surface for both reflectance and transmittance. The detector resides in the bottom of the integrating sphere orthoganol to the source. Reflectance values are relative to a 100% reflective standard. See the attached figures.

Due to difficulty in machining an optical quality surface, Ertalyle® PET (polyethylene terephthalate polyester) was excluded from further testing and % reflectance was not measured for this polymer. % reflectance of UV light was determined for Tecamax® SRP-120 (polyphenylene), Ultem® 1000 (polyetherimide), Ketron® 1000 (polyetheretherketone), Techtron® PPS (polyphenylene sulfide), Vespel® SP-1 (aromatic polyimide), Ertalyte® PET-P (polyethylene terephthalate polyester) and Vespel® TP (polyimide) at a UV wavelength of 200 to 500 nm. Only Tecamax® SRP-120 (polyphenylene) and Vespel® SP (aromatic polyimide) displayed acceptable amounts of non-reflectance. Polymers containing polyetherimide (Ultem® 1000), polyethylene terephthalate polyester (Ertalyte® PET-P) and polyetheretherketone (Ketron® 1000), and polyphenylene sulfide (Techtron® PPS) were excluded due to their high reflectance of UV light between the ranges of 200 to 500 nm. Lens molds were cast with Ultem® 1000 (polyetherimide) and Radel® R-5000 (polyphenylsulfone) polymers; however, the mold surface was severely damaged after casting a few lenses.

% Reflectance of Polyphenylene Polymers

Figure 3:
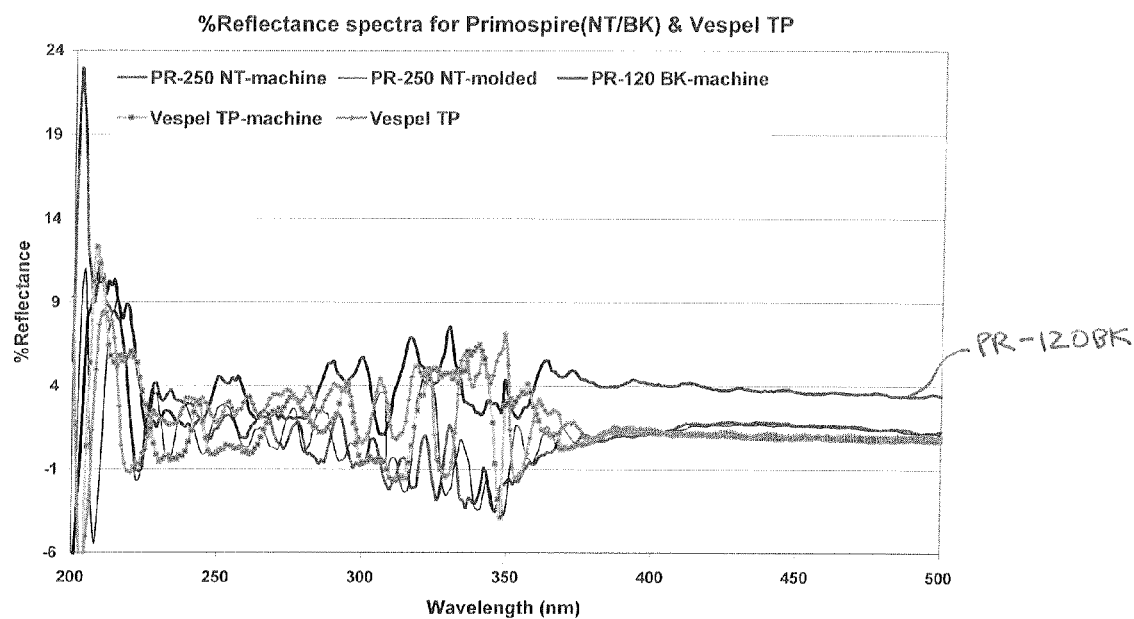
FIG. 3 shows the % reflectance of UV light for polyphenylene and aromatic polyimide polymers.

FIG. 3 shows the % reflectance spectra for a natural (NT) or an artificially blackened (BK) polyphenylene polymers. The polyphenylene polymers tested were PRIMOSPIRE® (PR)-250 NT-machine, PRIMOSPIRE® (PR)-250 NT-molded, or PRIMOSPIRE® (PR)-120 BK machine. PR-120 is an extrudable grade polyphenylene polymer with a high molecular weight. PR-250 is an injection moldable grade polymer with a lower molecular weight than PR-120. Results demonstrated relatively little difference exists between the % reflectance of machined PR-250 NT, the molded PR-250 NT, and the machined PR-120 BK polyphenylene. PR-120 BK polyphenylene showed a slight increase in the % reflectance between the ranges of 225 to 360 nm UV wavelength when compared to either PR-250 NT machine or PR-250 NT molded. In summary, the reflectance of the polyphenylene did not depend on the molecular weight or color of the polyphenylene.

The % reflectance for Vespel® TP and machined Vespel® TP (Vespel TP-machine), which are polyimides, was tested. Each displayed less than 8% reflectance of UV light at a wavelength from 250 nm to 500 nm.

% Transmittance

Figure 4:
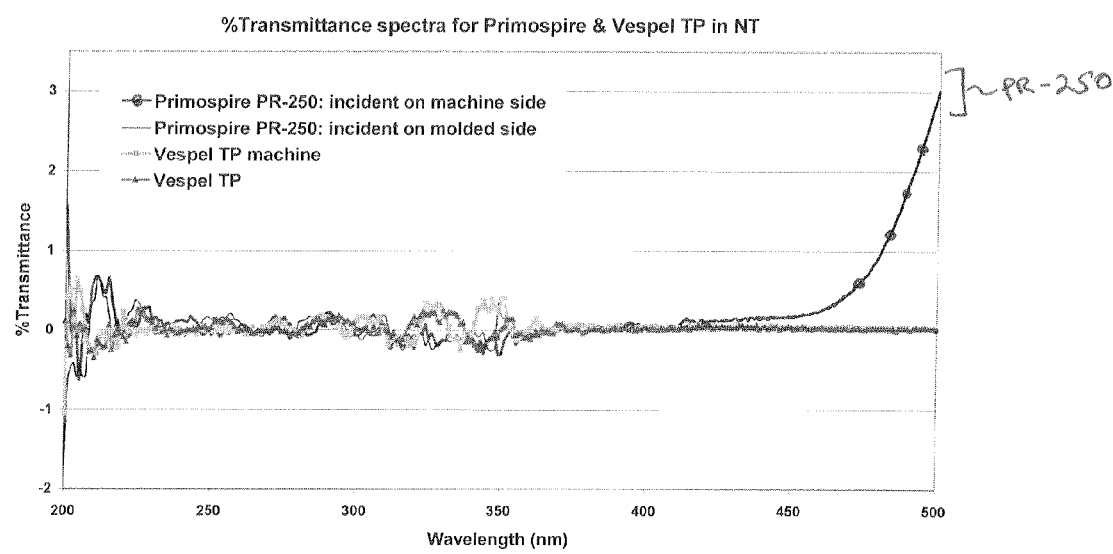
FIG. 4 shows the % transmittance of UV light for polyphenylene and aromatic polyimide polymers.

FIG. 4 shows the % transmittance of PRIMOSPIRE® PR-250-machine, PRIMOSPIRE® PR-250-molded, Vespel® TP machine, and Vespel® TP. Relatively little % transmittance of UV light was observed between in any of the machined or molded polymers between a UV wavelength of 250 nm to 450 nm.

Chemical Resistance

Chemical resistance of Tecamax SRP-120 (polyphenylene) and Vespel® SP-1 (aromatic polyimide) was tested. One inch discs of Tecamax® SRP-120 (polyphenylene) and Vespel® SP-1 (aromatic polyimide) were soaked in a lens-forming formulation composed of 24% by weight DMA for three days. No surface damage was observed.

Lens Quality

FIGS. 5A and 5B show lenses cast in poly(methyl methacrylate) (PMMA) molds. Lens cast in the PMMA molds displayed an unacceptable surface quality and crazing lines at the lens edge. In the worst cases, crazing lines were found across the entire lens surface (e.g., see upper left corner of FIG. 5B). Line crazing of these lenses was due to poor chemical resistance of the mold to solvents such as ethanol, DMA, IPA, and propanol. FIG. 5C shows lenses cast in either polyphenylene molds or aromatic polyimide molds using a lens-forming formulation composed of 24% by weight DMA. The lenses displayed no surface damage such as crazing as seen in lenses made with the PMMA mold.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A reusable device for producing an ophthalmic lens comprising a female mold half define an optical surface and a male mold half defining an optical surface, wherein the female mold half is made from a polymer comprising an aromatic polyimide, and wherein the male mold half is made from polyphenylene, quartz, glass, and wherein the aromatic polyimide comprises repeat units comprising the formula I, II, or III:

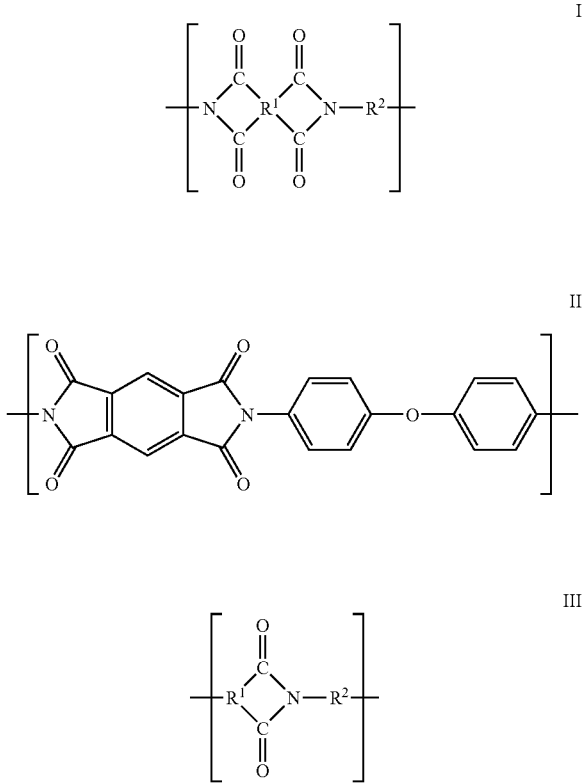

I

II

III wherein $R^1$ is substituted or unsubsituted aromatic ring, the four carbonyl groups are attached directly to separate carbon atoms in the aromatic ring, and each pair of carbonyl groups is attached to adjacent carbon atoms in the aromatic ring; and $R^2$ comprises a second substituted or unsubsituted aromatic ring.

2. A reusable device of claim 1, wherein the polymer absorbs UV light in the range of 250 to 400 nm.

3. A reusable device of claim 1, wherein the polymer substantially prevents the reflection and transmission of UV light from the device.

4. A reusable device of claim 1, wherein the polymer comprises a thermoplastic polymer or a thermoset resin.

5. A reusable device of claim 1, wherein the polyphenylene comprises a plurality of residues comprising the formula IV

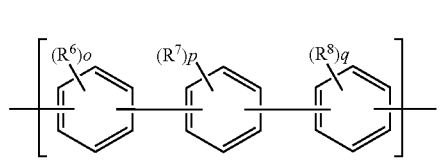

IV wherein $R^6$, $R^7$, and $R^8$ are, independently, hydrogen, a straight chain or branched alkyl, aryl, alkaryl aralkyl, alkyl amide, aryl amide, alkyl ester, aryl ester, alkoxy, polyalkeneoxy, polyphenylene oxide, polyvinyl chloride, polyalkylmethacrylate, polyacrylonitrile, polyalkylvinyl ether, polyvinyl alcohol, polyvinyl acetate, perfluoroalkyl, perfluoroalkoxy, polyester, polyamide, polyimide, poly(phenoxyphenyl ketone), ether, sulfone, aryl ketone, alkyl ketone, or heteroaryl; and o, p, and q are, independently, 0, 1, 2, or 3.

6. A reusable device of claim 5, wherein each aromatic ring is attached at the para position.

7. A reusable device of claim 5, wherein the polyphenylene comprises repeat units comprising the formula V

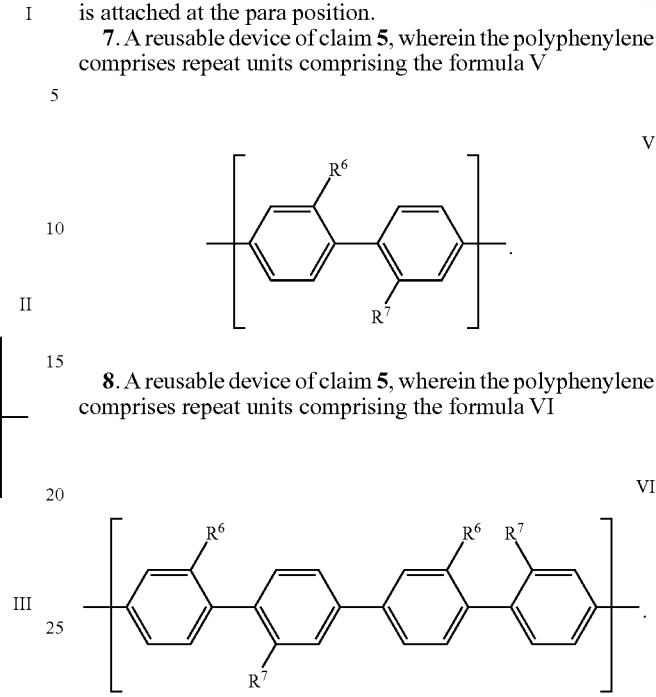

V

8. A reusable device of claim 5, wherein the polyphenylene comprises repeat units comprising the formula VI

VI

9. The reusable device of claim 1, wherein R1 comprises phenyl, napthyl, anthracene, phenanthrene, or pyrene.

10. The reusable device claim 1, wherein $R^2$ comprises the formula

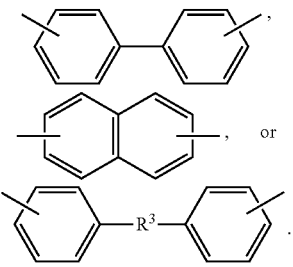

11. The device of claim 10, wherein $R^1$ comprises a phenyl group and $R^2$ comprises 12. A method for producing an ophthalmic lens comprising the steps of:
(a) introducing a lens forming material into a female mold half defining an optical surface and configured to form a cavity for receiving a lens forming material;
(b) applying a male mold defining an optical surface to the female mold comprising the lens forming material, wherein the male mold and female mold are configured to receive each other and form a mold cavity, wherein the optical surface of at least one mold half is made from a polymer comprising an aromatic polyimide; wherein the aromatic polyimide comprises repeat units comprising the formula I, II or III;

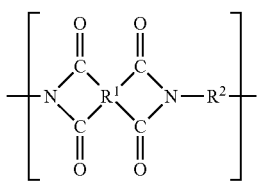

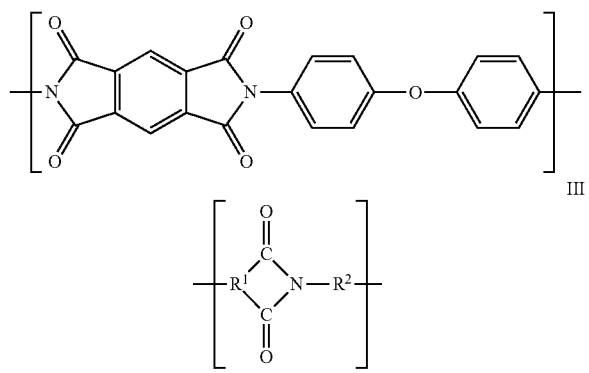

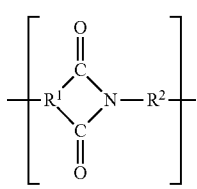

wherein $R^1$ is a substituted or unsubstituted aromatic ring, the four carbonyl groups are attached directly to separate carbon atoms in the aromatic ring, and each pair of carbonyl groups is attached to adjacent carbon atoms in the aromatic ring; and $R^2$ comprises a second substituted or unsubstituted aromatic ring; and (c) exposing the lens forming material to energy in order to crosslink the lens forming material and produce the lens.

13. The method of claim 12, wherein the female mold half is made from the polymer comprising an aromatic polyimide.

14. The method of claim 12, wherein both the female mold half and the male mold half are, independently, made from the polymer comprising an aromatic polyimide.

15. The method of claim 12, wherein the male mold half comprises quartz or glass.

16. The method of claim 12, wherein at least one mold half is permeable to UV light in the range of 250 to 400 nm.

17. The method of claim 12, wherein step (c) comprises irradiating the lens forming material with UV light in the range of 250 to 400 nm for a sufficient time in order to crosslink the lens forming material and produce the lens.

18. The method of claim 12, wherein step (c) comprises heating the lens forming material for a sufficient time to crosslink the lens forming material and produce the lens.

19. The method of claim 12, wherein the female mold half is made from a polymer comprising an aromatic polyimide; and step (c) comprises irradiating the lens forming material with UV light in the range of 250 to 400 nm for a sufficient time in order to crosslink the lens forming material and produce the lens.

20. The method of claim 12, wherein the lens comprises a contact lens.

* * * * *